Aug. 11, 1931.  J. ELGER  1,818,053

DUPLEX AUTOMATIC AIR VENT VALVE

Filed Nov. 5, 1928

WITNESSES

INVENTOR.

BY Joseph Elger

ATTORNEYS.

Patented Aug. 11, 1931

1,818,053

UNITED STATES PATENT OFFICE

JOSEPH ELGER, OF CHICAGO, ILLINOIS

DUPLEX AUTOMATIC AIR VENT VALVE

Application filed November 5, 1928. Serial No. 317,402.

My invention relates to duplex automatic air vent valves used in connection with hot water radiators.

A valve of this kind is needed as the hand operated valves now in use cause lots of trouble and require continuous hand operation to keep the radiator filled with water and vented and they become air bound and then do not heat properly.

The object of my invention is to provide an automatic valve that keeps a radiator vented of the air and filled with water and a valve that is positive and safe. The invention is illustrated in the accompanying drawings wherein:—

Figure 1:
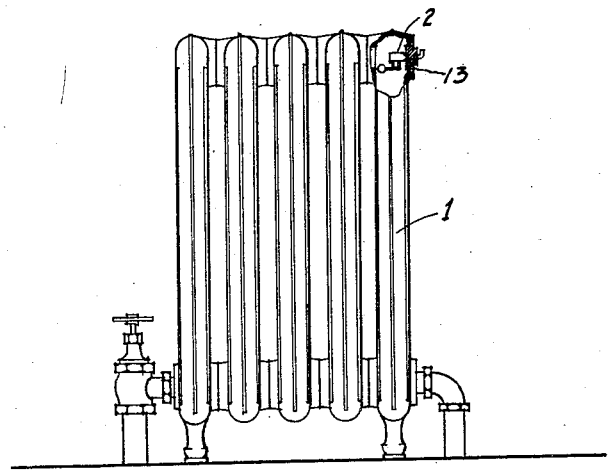
Figure 2:
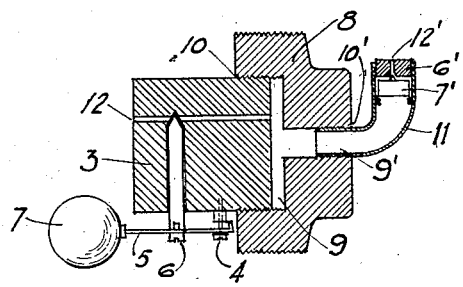

Figure 1 is a radiator embodying the invention. Figure 2 is a vertical sectional view of the valve structure.

Like numerals refer to like parts throughout the several figures.

Referring now to Figure 1, I have shown a radiator 1 made up of a series of sections connected together at top and bottom. The radiator 1 has a cut out part of the top of the return end section showing the valve placed in position for use.

The duplex valve structure generally designated by numeral 2, is composed of inner and outer valve units. The inner valve unit comprises a body portion 3 having an air passage 12 therethrough in communication intermediate its ends with a second passage containing a valve 6 which is pivoted to the float arm 5 fulcrumed at 4, as shown in Fig. 2.

Part 8 is a tapped threaded plug having a threaded opening on each side of the plug 8 as shown. The threaded end 10 of the body portion 3 is screwed into the inner side of the threaded opening 9 of the plug 8. The tube 11 also has a threaded end 10'. The threaded end 10' is screwed into the outer part of the threaded opening 9' of the plug 8 as shown.

The tube 11 also has a float 7' which rests on small lugs as shown on the inside of said tube, said float having a valve head mounted thereon for closing the air passage 12', which communicates at one end with the atmosphere and at the other end with the passage in the tube 11 leading from the passage 12 of the body portion 3. The structure 2 is made to pass into the threaded opening 13 shown at the top of the radiator. The plug 8 is then screwed into the threaded opening 13 tight with the tube 11 facing straight up.

The operation is as follows: The water rises in the radiator and presses the air out through the openings 12—12' into the atmosphere and when the water rises to the float, it raises the float and closes the valve. It should be further seen that the valve stem part 6 shown on the inner side of the plug 8 operates to close the air opening 12 on two sides in the sense that a gate valve operates, which is a double protection against leaks and the float valve 7' shown on the outer side of the plug 8 operates to release the air but will not allow any water to escape by reason that if the water would rise in the tube 11 it would raise the float and close the opening 12'. Both floats operate to exhaust the air but do not allow any escape of water. The outer float acts as a safety device in the event that the inner float fails to function properly.

I have shown in the drawings a simple and particular construction for the purpose of illustration, but it is of course evident that this construction may be varied without departing from the spirit of my invention.

I claim:

A unitary duplex vent valve structure including; a threaded plug adapted to be screwed into the standard threaded opening of the end section of a radiator, said plug having an aperture therethrough; a float-controlled air valve carried by said plug on one side thereof; and a float controlled valve carried by said plug on the opposite side thereof, each of said valves being adapted to permit air to escape therethrough and prevent the escape of water.

In testimony whereof I affix my signature.

JOSEPH ELGER.